Figure 1:
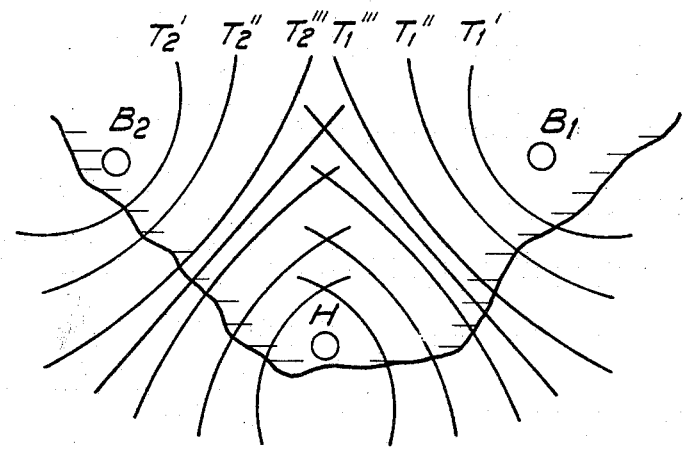

INVENTOR.
BENGT G. GUSTAFSSON

May 3, 1966 B. G. GUSTAFSSON 3,249,911
METHOD AND DEVICE FOR DETERMINING THE POSITION
OF SOUND SOURCES IN WATER
Filed Aug. 26, 1963 3 Sheets-Sheet 2

INVENTOR.
BENGT G. GUSTAFSSON
BY
AGENT

United States Patent Office 3,249,911
Patented May 3, 1966

3,249,911
METHOD AND DEVICE FOR DETERMINING THE POSITION OF SOUND SOURCES IN WATER
Bengt Gunnar Gustafsson, Vallingby, Sweden, assignor to North American Philips Company, Inc., New York, N.Y., a corporation of Delaware
Filed Aug. 26, 1963, Ser. No. 304,526
Claims priority, application Sweden, Sept. 10, 1962, 9,763/62
8 Claims. (Cl. 340—6)

The present invention relates to a method and apparatus for determining the position of sound sources in water, such as submarines or the like, by passive listening to sound emanating from the source.

Known devices for determining the position of sound sources by passive listening to sound emanating from a sound source are based upon the principle of determining the direction to the sound source from at least two separated points. The position of the sound source then is determined as the point of intersection between the two measured directions. The direction measurement is effectuated in a known type of locating device by means of a microphone arrangement which is very sensitive to changes in the direction of the received energy, for example, a device consisting of a number of microphones equidistantly situated along a rectilinear line. The output signals from the individual microphones are then added in an adding device and in operation the whole microphone arrangement is turned until a maximum appears in the signal from the adding device. In order to provide a highy directional effect, the microphone arrangement must have a great extension in length relative to the wave length of the received sound waves in water. Equipment of this type will therefore be relatively bulky and difficult to handle. In a modification of this known device, the individual microphones are placed in a ring instead of along a rectilinear line and time delay means are arranged in the signal lines between the different microphones and the adding device. The delays of said time delay means are adjusted to different predetermined fixed values so chosen that the microphone arrangement as a whole, in combination with the time delay means, works in the same way as if the individual microphones were placed along a rectilinear line. The same directional effect as in the preceding case is thus achieved.

According to the invention, the position of an object is determined by detecting the sound waves radiated from the object in listening stations situated in spaced relationship. The detected sound waves are converted to electrical signals which are fed to coherence indicating means through adjustable time delay means so that the position of the object can be hyperbolically determined by means of the time delays set in the said time delay means for achieving coherence.

A device for carrying out the method comprises a plurality of listening stations arranged in spaced relationship and adapted to detect sound radiated from the object and produce electrical signals representing the received sound signals. The device further comprises correlator means adapted to compare two such electrical signals and indicate coherence between the compared signals. At least one of the signals is time delayed in an adjustable time delay device connected in the connection line between respective listening station and correlator means, whereby the hyperbola in the hyperbolic system based upon the travel time differences for the sound in water from the object to the actual stations, on which the object is situated, is determined by the time delays set in the said time delay devices for achieving coherence.

Correlation and determining coherence between two signals is preferably effectuated by multiplying the two signals in a multiplication device and measuring or registering the output signal from the multiplication device. This output signal will have a sharp maximum when comparing two coherent signals, whereas for all non-coherent signals it will be practically equal to zero. All disturbing sound signals are automatically suppressed by the multiplication procedure.

The device can either be built up by components working with analog signals or alternatively by components working with digital signals. The incoming sound signals in the latter case are digitalized or quantized before the evaluation. In the analog case, the output signal from the correlator means is the D.C.-voltage component of the output voltage from the multiplication device. Therefore, in addition to the multiplier device, the correlator means must also comprise suitable filtering means having a low pass characteristic, for example, a "forgetting" integrator. The use of a filter which simultaneously has an integrating function increases the selectivity of the device. The digital component corresponding to a forgetting integrator is a shift register.

Figure 2:
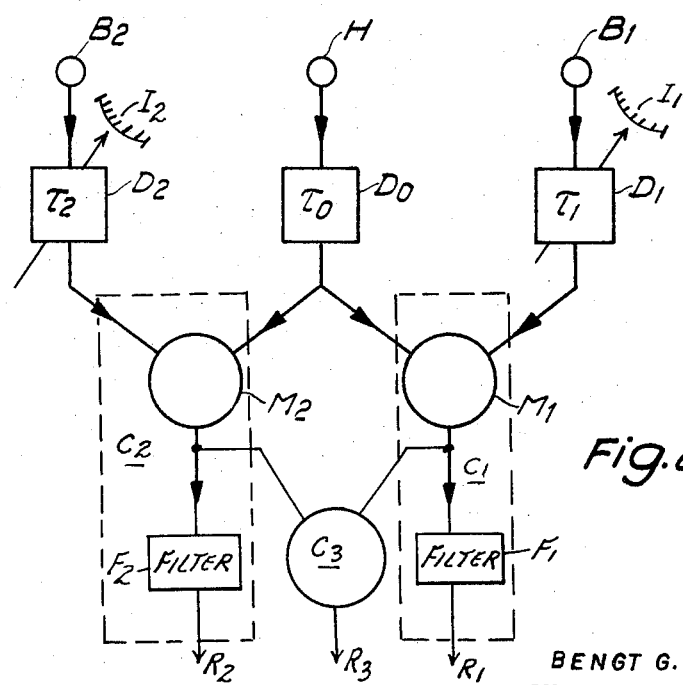
Figure 3:
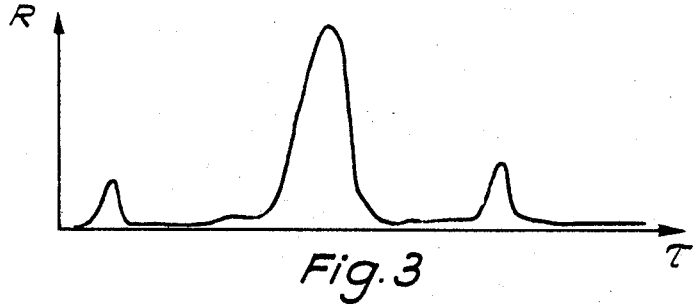
Figure 4:
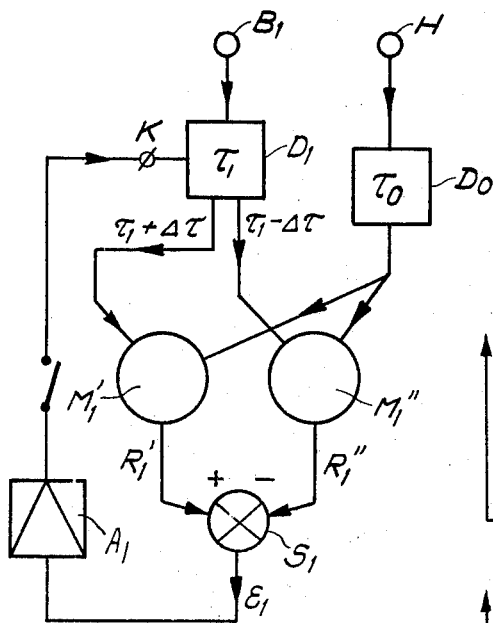
Figure 5:
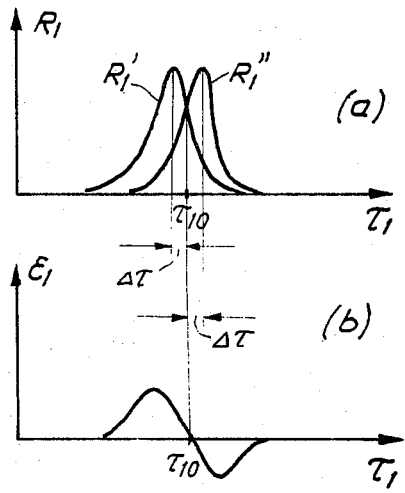
Figure 6:
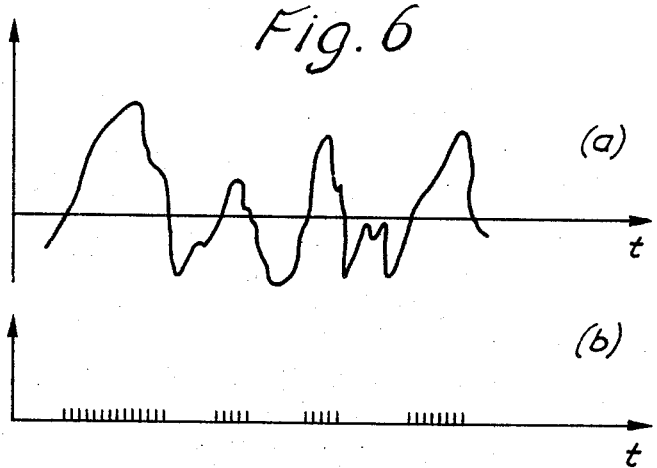
Figure 7:
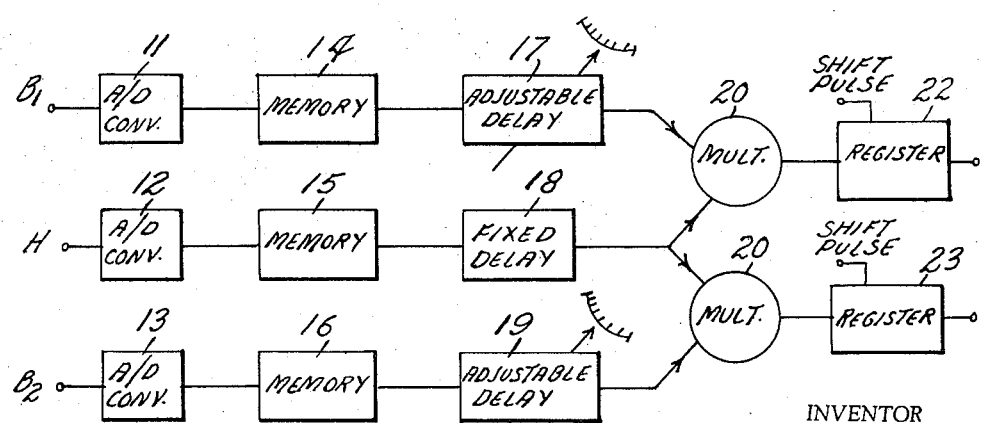

The invention will now be explained more fully by means of the following description taken with reference to the accompanying drawings, in which:

FIG. 1 shows the geometrical positioning of the microphones in a device according to the invention, FIG. 2 shows in block schematic form a diagram of the electrical connection between the different components of the device, FIG. 3 shows a diagram of the output voltage from a correlator as a function of the time delay in a device according to FIG. 2, FIG. 4 shows a closed loop circuit for locking the device on a predetermined sound source, FIGS. 5(a) and (b) show diagrams for illustrating the function of the device according to FIG. 4, FIG. 6 shows the signals produced by quantizing or digitizing a sound signal, and FIG. 7 shows a modification of the invention which utilizes digital signals.

In FIG. 1, the references H, $B_1$ and $B_2$ designate three listening stations having microphones situated in the water for passive listening to sound emanating from a target, the position of which is to be determined. Of the stations shown, H is called the main listening station and $B_1$, $B_2$ are secondary listening stations.

Due to the fact that sound has a limited speed of propagation in water, the sound from a target situated at different distances from the stations will reach the individual stations with a certain time difference. The invention is based upon the principle that the position of the target can be determined by measuring these travel time differences, at least two such travel time differences being measured, each referring to two of the stations. In the example shown the determination of position is assumed to be effectuated by measuring the difference in travel time of the sound from the target to the stations H and $B_1$ and H and $B_2$, respectively, which time differences are called $T_1$ and $T_2$. The locus for $T_1$ and $T_2$, respectively, will, as known, be hyperbolic curves built up around the connection line between H and $B_1$ and H and $B_2$, respectively, and the central normal to these lines. This is shown in FIG. 1 by the curves $T_1'$, $T_1''$, $T_1''' \ldots$ and $T_2'$, $T_2''$, $T_2''' \ldots$, respectively.

After measuring the time differences $T_1$ and $T_2$ for a certain sound source, the point of intersection between the hyperbolas corresponding to the measured time differences is located on a map provided in advance with hyperbolic curves. The point of intersection indicates the position of the sound source. Of course it is possible to determine the time difference for any two stations. For example, in the system shown in FIG. 1, the time difference between the sound waves received in $B_1$ and $B_2$ could also be measured. The stations to be paired are chosen so that the most favourable intersection angles in the target domain is achieved. It is also possible to use more than three stations for achieving an overdetermination and thereby increase the measuring accuracy.

The microphone arrangements in the different stations can be of the type that are sensitive to changes in the direction of the actual detected frequencies, but this direction sensitivity is not essential and is used only as an auxiliary means for achieving better sound levels and/or possibly for suppressing disturbing sound arising at shorelines, etc.

FIG. 2 shows a device for carrying out the described position determining method, which device is assumed to work according to the analog principle. In the figure are shown the listening stations H, $B_1$ and $B_2$. $D_0$, $D_1$ and $D_2$ are time delay devices having time delays $\tau_0$, $\tau_1$ and $\tau_2$, respectively, and $C_1$ and $C_2$ are correlators. The expression "correlators" describes a device adapted to compare two signals and indicate coherence between the compared signals.

The said components are so connected that the sound signals emanating from the stations H and $B_1$, after time delay in the devices $D_0$ and $D_1$, respectively, are fed to the correlator $C_1$. The sound signals emanating from the stations H and $B_2$, after time delay in the devices $D_0$ and $D_2$, respectively, are fed to the correlator $C_2$.

The time delay devices for the described analog embodiment are conventional analog delay devices, for example, of a type of magnetic recorder having several magnetic heads of which at least one is displaceable. The device $D_0$ is set such that it produces a constant time delay $\tau_0$ substantially equal to the travel time of sound in water corresponding to the largest one of the distances $H-B_1$ and $H-B_2$. The time delays $\tau_1$ and $\tau_2$ of the two devices $D_1$ and $D_2$ are variable. By this choice of constant time delay, the whole target range can be covered by variations of $\tau_1$ and $\tau_2$ from zero without switching operations being necessary due to the fact that the time delay devices cannot produce negative time delays. The correlators comprise conventional multiplication devices $M_1$ and $M_2$, for example, diode multipliers, Hall-effect multipliers or the like. The output signals $R_1$ and $R_2$, respectively, from the correlators are the D.C.-voltage components of the signal produced by multiplication of the two sound signals. The D.C.-voltage component will have a sharp maximum when multiplying two coherent signals, whereas for all other signals it will be practically equal to zero. As the multiplication signal will have a very great content of A.C.-voltage components, each correlator $C_1$ and $C_2$ must furthermore contain suitable filtering means $F_1$ and $F_2$ for suppressing these A.C.-voltage components, for example, a "forgetting" integrator, i.e. an integrator in which the integrating capacitor is shunted by a resistance. Alternatively, any type of low pass filter may be used. The accuracy of the multiplication procedure is not critical.

If sound sources are present in the target domain, and $\tau_1$ or $\tau_2$ is varied, the output signal from the correlators $C_1$ or $C_2$, respectively, will vary with $\tau$ as shown in FIG. 3, in which each peak corresponds to a sound source. After determination of the value of $\tau_1$ and $\tau_2$ for achieving maximum output signal from the respective correlator, it is a simple procedure to determine corresponding travel time differences and thus the position of the sound source with knowledge of the propagation speed of sound in water and the value of the constant time delay $\tau_0$. Eventually the hyperbolas shown in FIG. 1 can be marked directly in time delay $\tau_1$ and $\tau_2$, respectively, for a predetermined value of $\tau_0$.

In an embodiment of the described device, the time delays $\tau_1$ and $\tau_2$ are set manually and the D.C.-voltages at the outputs of the correlators are supplied to pointer instruments. An operator then varies $\tau_1$ and $\tau_2$ under observation of the indication of the instrument for determining the time delays corresponding to such hyperbolas on which sound sources are situated. By simultaneously adding the signals appearing at the inputs of the correlators in an addition circuit, and feeding the resulting signal to a hearing instrument of the operator, the sound sources can also be identified and disturbing fixed sound sources can be eliminated. The operator can also listen to the multiplied non-filtered signal whereby, however, the individual frequencies will be doubled.

In a further embodiment of the invention, in order to insure that the two time delays $\tau_1$ and $\tau_2$ are set so that the output signals $R_1$ and $R_2$ represent the same sound source, the A.C.-voltage signals received from the multiplication devices $M_1$ and $M_2$ included in the correlators $C_1$ and $C_2$ can be compared in a further correlator $C_3$. A significant output signal $R_3$ from this further correlator then indicates that the output signals from the correlators $C_1$ and $C_2$ relate to the same sound source. The amount of time delay set into time delay devices $D_1$ and $D_2$ to achieve coherence can be displayed by means of a pointer and scale, $I_1$ and $I_2$, suitably calibrated.

FIG. 4 shows an arrangement for locking the device on a certain sound source so that the time delays are automatically varied in response to movements of the sound source relative to the listening stations. Only the apparatus relating to the secondary listening station $B_1$ is shown and it is to be understood that corresponding circuits are required for each secondary listening station. As in the device described in FIG. 2, the sound signals received from the listening stations H and $B_1$ are fed to the time delay devices $D_0$ and $D_1$, respectively, to be delayed in these devices. The device $D_0$ is set such that it produces a fixed time delay $\tau_0$, whereas $D_1$ changes its delay in dependence upon a control signal fed to a control terminal K. The device $D_1$ has two outputs producing signals delayed by slightly different values in relation to the incoming signal. If the time delay set in the device $D_1$ is designated $\tau_1$, the signal appearing at one of the outputs will have a time delay exceeding $\tau_1$ by a small value $\Delta \tau$, while the signal appearing at the second output will have a time delay which is the same small value $\Delta \tau$ smaller than $\tau_1$. The signals appearing at the outputs of the device $D_1$ are fed to a first input of two correlators $M_1'$ and $M_1''$, while to the second input of the said correlators is fed the signal from the main listening station H having a time delay with a constant value $\tau_0$. The output signals $R_1'$ and $R_1''$ of the correlators are subtracted in a subtraction device $S_1$ and the difference signal $\epsilon_1$ is fed back after suitable amplification in an amplifier $A_1$ to the said control terminal K of the time delay device $D_1$ for varying the time delay $\tau_1$. In order to explain the function of the device, let it be assumed for the moment that the feed back loop is broken and that $\tau_1$ is varied. The output signal at the two outputs of the correlators $M_1'$ and $M_1''$ will vary with $\tau_1$ as shown in FIG. 5(a). As can be seen from the figure, the two peaks representing a given sound source are displaced somewhat in relation to each other depending upon the constant difference in time delay of the two signals fed to the respective correlators. After subtraction in $S_1$, a difference signal $\epsilon_1$ is produced which varies with $\tau_1$ as shown in FIG. 5(b). The difference signal $\epsilon_1$, which passes through zero and changes sign at the value $\tau_{10}$, is fed back after amplification in the amplifier $A_1$ to the control terminal K of the device $D_1$ for varying the time delay produced by $D_1$ in such a direction that the difference signal $\epsilon_1$ in the feed back system is regulated to zero. The delay of the device $D_1$ is thus controlled continuously and automatically to a value approximately equal to the value $\tau_{10}$, which value indicates the hyperbola on which the sound source is situated. The higher the amplification in the loop, the smaller is the error signal $\epsilon_1$, and the more $\tau_1$ will approach the correct value $\tau_{10}$. The position of the sound source is determined by reading the instantaneous value of $\tau_1$ and corresponding values for the remaining listening stations.

In a device working with digital signals instead of analog signals, the incoming sound signal can be quantized or digitized as shown in FIGS. 6 and 7. According to the said figures the incoming sound signal shown in FIG. 6a and appearing at input terminals H, $B_1$ and $B_2$ of FIG. 7 is converted into the pulse series shown in FIG. 6b. By means of well known analog-to-digital converters 11, 12 and 13, the input analog signal is converted into pulses having a constant pulse repetition frequency during those time intervals when the sound signal is positive at terminals H, $B_1$ and $B_2$. Converters 11, 12 and 13 supply the pulses to a digital memory, represented by memory elements 14, 15 and 16, for temporary storage therein of the pulses. During those time intervals when the sound signal is negative, no pulses are passed to memory devices 14, 15 and 16. The pulse shaped signals produced in this way, representing sound signals from different sound sources, are thus recorded in the digital memory. The different pulse signals are then read out of the digital memory with a certain time delay in principle in the same way as described in connection with the analog case. For example, individual time delay devices 17, 18 and 19 may be coupled to the memory outputs to provide the time delayed pulse signals. Time delay devices 17 and 19 are adjustable and time delay device 18 is fixed, as in the analog system of FIG. 2. The time delayed signals are then fed to correlators 20 and 21 comprising multiplication devices which multiply the pulse shaped signals according to the following laws:

$$1 \times 1 = 1$$
$$0 \times 0 = 1$$
$$1 \times 0 = 0$$
$$0 \times 1 = 0$$

The number 1 indicates the presence of a pulse and 0 the absence of a pulse or a gap in the pulse series.

It is evident that when multiplying two coherent pulse signals, a maximum number of pulses are received from the multiplication device, namely a continuous pulse series, whereas multiplication of non-coherent signals will give an output signal from the multiplication device which has gaps in the pulse series.

The pulse series from the multiplication devices 20 and 21 are supplied to registers 22 and 23. The registers are preferably of the forward-backward type, so that the number stored in the register is increased one unit at the appearance of a pulse and is decreased one unit at the absence of a pulse in the pulse series fed to it. When feeding to such a register a pulse series produced by multiplying any two non-coherent pulse signals, which pulse series will contain approximately the same number of pulses and gaps, the number stored in the register will be substantially constant disregarding small fluctuations. On the other hand, if a pulse series produced by multiplying two coherent pulse signals is supplied to the register, which pulse series will contain only pulses and no gaps, the number stored in the register will increase heavily. In order to insure that the measuring result from the preceding time intervals shall not remain forever in the register, according to a preferred embodiment, the register comprises a shift register, i.e. a register in which the stored information representing a number at evenly distributed time moments is displaced one or more steps in such a direction that the stored number is decreased. The shift register, which corresponds to a forgetting integrator in the analog case, can be read immediately before or immediately after the shifting.

Digital multiplication devices and shift registers are well known components and are therefore not described in detail. Different methods for digitizing or quantizing, which process is not necessary to be carried out according to the principle shown in FIG. 6, are also well known.

As in the analog case, one of the signals fed to a correlator is time delayed a constant value, while the time delay $\tau_1$ and $\tau_2$, respectively, of the second signal is varied. The process can be controlled such that the variable time delay $\tau_1$ and $\tau_2$, respectively, varies automatically and successively in steps of for example a pulse period across the actual measuring range and the number read in the register for each value of $\tau_1$ and $\tau_2$, respectively, can be stored in a digital memory. The position of the different sound sources can thereafter be determined by reading the information stored in the said digital memory. The described methods can also be combined in that a digital device of described type works continuously and all sound sources situated within the actual measuring range and having a sound level exceeding a predetermined threshold value are continuously represented on a cathode ray tube. An operator can then in described way listen to and identify the different sound sources and choose one of the sound sources for locking the device on the selected one of the said sources.

What is claimed is:

1. A system for locating the position of an energy radiating source comprising first, second and third spaced apart energy receiving means, said first, second and third receiving means each comprising means responsive to the energy received from said source for producing first, second and third electric signals, respectively, which vary in accordance with said received energy, first controllable delay means arranged to receive said first electric signal and produce a first delayed signal, second controllable delay means arranged to receive said second electric signal and produce a second delayed signal, first and second correlator means each adapted to compare two electric signals and produce a signal indicating coherence between the compared signals, said indicating signal having a direct current component and an alternating current component, means for supplying said first delayed signal and said third signal to said first correlator means to produce a first indicating signal, means for applying said second delayed signal and said third signal to said second correlator means to produce a second indicating signal, third correlator means, and means for applying the alternating component of said first and second indicating signals to said third correlator means, whereby said third correlator means produces a characteristic signal indicative of simultaneous reception of energy from the same source.

2. A system for automatically tracking the position of a movable energy radiating source comprising first, second and third spaced apart energy receiving stations, each of said stations comprising means responsive to the energy received from said source for producing an electric signal which varies in accordance with said received energy, first controllable delay means arranged to receive a first electric signal produced by the signal producing means of said first station, said first delay means having a control terminal and output means for supplying first and second adjustable delay signals separated by a fixed time delay and corresponding to said first electric signal, second controllable delay means arranged to receive a second electric signal produced by the signal producing means of said second station, said second delay means having a control terminal and output means for supplying third and fourth adjustable delay signals separated by a fixed time delay and corresponding to said second electric signal, third delay means having a fixed delay and arranged to receive a third electric signal produced by the signal producing means of said third station, said third delay means producing a fifth delay signal, first, second, third and fourth correlator means each adapted to compare two electric signals and produce a signal indicating coherence between the compared signals, means for applying said first and fifth, said second and fifth, said third and fifth, and said fourth and fifth delay signals to said first, second, third and fourth correlator means, respectively, first means for comparing the indicating signals produced by said first and second correlator means to produce a first error signal, second means for comparing the indicating signals produced by said third and fourth correlator means to produce a second error signal, means for coupling said first error signal to the control terminal of said first controllable delay means thereby to alter the time delay therein in a sense to reduce said first error signal to a null, and means for coupling said second error signal to the control terminal of said second controllable delay means thereby to alter the time delay therein in a sense to reduce said second error signal to a null.

3. A system for locating the position of an energy radiating object comprising first, second and third spaced apart energy receiving means, said first, second and third receiving means each comprising means responsive to the energy received from said object for producing first, second and third electric signals, respectively, which vary in amplitude in accordance with said received energy, first, second and third means for converting said first, second and third electric signals, respectively, to a first, second and third group of pulse signals having repetition rates which are independent of the signal amplitude, respectively, which vary in a predetermined manner with said first, second and third electric signals, respectively, first adjustable delay means responsive to said first signal pulse group for producing a first delayed signal pulse group, second adjustable delay means responsive to said second signal pulse group for producing a second delayed signal pulse group, first and second correlator means each adapted to compare two signal pulse groups and produce a signal pulse group in which coherence between the compared pulse groups is indicated by a maximum number of pulses in a given time interval, means for applying said first delayed signal pulse group and said third signal pulse group to said first correlator means, and means for applying said second delayed signal pulse group and said third signal pulse group to said second correlator means, said first and second delay means further comprising means for varying the respective delay times of said first and second delay means to bring said first and third and said second and third signal pulse groups, respectively, into time synchronism, and means for indicating the values of said first and second time delays.

4. Apparatus as described in claim 3, wherein each of said first and second correlator means comprises multiplier means having two inputs for receiving the respective signal pulse groups applied to the associated correlator means and an output, each of said correlator means further comprising a forward-backward register coupled to its associated multiplier means output for indicating said time synchronism of the signal pulse groups applied to its associated multiplier means.

5. Apparatus as described in claim 4 wherein each of said registers are shift registers.

6. Apparatus as described in claim 3 wherein each of said first and second correlator means comprises means for comparing first and second signal pulse groups to produce an output pulse group according to the following formula:

$$1 \times 1 = 1$$
$$0 \times 0 = 1$$
$$1 \times 0 = 0$$
$$0 \times 1 = 0$$

wherein a 1 indicates the presence of a pulse in a pulse group and a 0 indicates the absence of a pulse in a pulse group.

7. A hyperbolic detection system for locating the position of a source of sound waves comprising first, second and third spaced apart sound receiving stations, each of said stations comprising means for converting the received sound wave energy into a varying electrical signal having positive and negative excursions about a reference value, each of said first, second and third stations further comprising means responsive to the said respective electrical signal for producing first, second and third signal pulse groups, respectively, in which pulses are only supplied either during the positive or negative excursions of the said respective electrical signal, but not during both, first, second and third time delay means arranged to receive said first, second and third signal pulse groups, respectively, and produce first, second and third delayed pulse groups, respectively, first and second correlator means each adapted to compare two signal pulse groups and produce a signal indicating coherence between the compared pulse groups, means for applying said first delayed signal pulse group and said third delayed signal pulse group to said first correlator means, and means for applying said second delayed signal pulse group and said third delayed signal pulse group to said second correlator means, said first and second delay means further comprising means for varying the respective delay times of said first and second delay means to bring said first and third and said second and third signal pulse groups, respectively, into time synchronism.

8. A tracking correlator system for a movable energy radiating source comprising first and second spaced apart energy receiving stations, each of said stations comprising means responsive to the energy reecived from said source for producing an electric signal which varies in accordance with said received energy, a first controllable delay means arranged to receive the first of said two electric signals, said first delay means having a control terminal and output means for supplying first and second adjustable delay signals separated by a fixed time delay and corresponding to said first electric signal, second delay means having a fixed delay and arranged to receive the second of said two electric signals and supply a third delay signal, first and second correlation multiplier circuits for providing a product signal in response to a pair of applied signals, means for applying said first and third and said second and third delay signals to said first and second correlation multiplier circuits, respectively, means for comparing the product signals provided by said first and second correlation multiplier circuits to produce a control signal proportional to the difference between said product signals, and means for coupling said control signal to the control terminal of said controllable delay means, said controllable delay means being responsive to said control signal to vary the time delay therein in a sense to reduce said control signal to a null.

References Cited by the Examiner

UNITED STATES PATENTS

| | | | |
|---|---|---|---|
| 2,166,991 | 7/1939 | Guanella | 340—6 |
| 2,940,076 | 6/1960 | Bissett et al. | 343—112 |
| 2,958,039 | 10/1960 | Anderson | 324—77 |
| 2,968,022 | 1/1961 | Unterberger | 340—15.5 |
| 3,039,094 | 6/1962 | Anderson | 340—6 X |
| 3,134,896 | 5/1964 | Briggs | 235—181 |
| 3,137,854 | 6/1964 | Anderson | 340—6 X |
| 3,185,958 | 5/1965 | Masterson et al. | 340—15.5 |

OTHER REFERENCES

Rosenheck: Detecting Signals by Polarity Coincidence, Electronics, Jan. 29, 1960, pages 67–69.

CHESTER L. JUSTUS, *Primary Examiner.*

LEWIS H. MYERS, *Examiner.*

R. A. FARLEY, *Assistant Examiner.*